US010224709B2

United States Patent
Jin et al.

(10) Patent No.: US 10,224,709 B2
(45) Date of Patent: Mar. 5, 2019

(54) BATTERY PROTECTIVE CIRCUIT

(71) Applicant: SAMSUNG SDI CO., LTD., Yongin-si, Gyeonggi-do (KR)

(72) Inventors: Kyong-Pil Jin, Yongin-si (KR); Myung-Sang Lee, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 6 days.

(21) Appl. No.: 15/417,559

(22) Filed: Jan. 27, 2017

(65) Prior Publication Data

US 2017/0244239 A1 Aug. 24, 2017

(30) Foreign Application Priority Data

Feb. 24, 2016 (KR) .................. 10-2016-0022044

(51) Int. Cl.
*H02J 7/00* (2006.01)
*H02H 7/18* (2006.01)

(52) U.S. Cl.
CPC ............. *H02H 7/18* (2013.01); *H02J 7/008* (2013.01); *H02J 7/0031* (2013.01); *H02J 7/0063* (2013.01); *H02J 2007/0067* (2013.01)

(58) Field of Classification Search
CPC .......... H02H 7/18; H02J 7/008; H02J 7/0026; H02J 7/0031; H02J 7/0063; H02J 2007/0037; H02J 7/004; H02J 2007/0039
USPC .................................................. 320/136, 107
See application file for complete search history.

(56) References Cited

U.S. PATENT DOCUMENTS

| | | | | |
|---|---|---|---|---|
| 5,684,663 | A  * | 11/1997 | Mitter | H02H 5/042 |
| | | | | 361/100 |
| 2002/0079865 | A1* | 6/2002 | Thomas | H02H 9/042 |
| | | | | 320/136 |
| 2009/0111005 | A1 | 4/2009 | Hur | |
| 2010/0141215 | A1* | 6/2010 | Takeda | H01M 10/48 |
| | | | | 320/136 |
| 2012/0313574 | A1* | 12/2012 | Maetani | H02J 7/008 |
| | | | | 320/107 |

FOREIGN PATENT DOCUMENTS

| | | |
|---|---|---|
| KR | 10-2006-0059679 A | 6/2006 |
| KR | 10-2009-0043919 A | 5/2009 |
| KR | 10-2014-0044511 A | 4/2014 |

* cited by examiner

*Primary Examiner* — Paul Dinh
(74) *Attorney, Agent, or Firm* — Lee & Morse, P.C.

(57) ABSTRACT

A battery protective circuit includes a battery controller, a charging control transistor, and a protection circuit. The battery controller controls charging of a battery according to a charging control voltage output through a charging control terminal. The a charging control transistor electrically connects the battery to a charger or to electrically disconnect the battery from the charger. The protection circuit includes a voltage sensing terminal electrically connected to a load, an input terminal electrically connected to the charging control terminal, and an output terminal electrically connected to a gate terminal of the charging control transistor. The protection circuit outputs a signal through the output terminal to turn off the charging control transistor, regardless of the charging control voltage of the input terminal, when a voltage equal to or greater than a threshold voltage is sensed at the voltage sensing terminal.

14 Claims, 2 Drawing Sheets

BATTERY PROTECTIVE CIRCUIT

CROSS-REFERENCE TO RELATED APPLICATION

Korean Patent Application No. 10-2016-0022044, filed on Feb. 24, 2016, and entitled, "Battery Protective Circuit," is incorporated by reference herein in its entirety.

BACKGROUND

1. Field

One or more embodiments described herein relate to a battery protective circuit.

2. Description of the Related Art

A battery protective circuit protects batteries from damage by short circuit, disconnection, overcurrent, or overvoltage conditions, which, for example, may occur when the battery is charged or discharged. While this type of circuit is useful, it is not without drawbacks.

SUMMARY

In accordance with one or more embodiments, a battery protective circuit includes a battery controller including a charging control terminal, the battery controller to control charging of a battery according to a charging control voltage output through the charging control terminal; a charging control transistor to electrically connect the battery to a charger or to electrically disconnect the battery from the charger; and a short circuit preventing circuit including a voltage sensing terminal electrically connected to a load, an input terminal electrically connected to the charging control terminal, and an output terminal electrically connected to a gate terminal of the charging control transistor, the short circuit preventing circuit to output a signal through the output terminal to turn off the charging control transistor, regardless of the charging control voltage of the input terminal, when a voltage equal to or greater than a threshold voltage is sensed at the voltage sensing terminal.

The battery protective circuit may include a discharging control transistor to electrically connect the battery to the load or to electrically disconnect the battery from the load, wherein the discharging control transistor includes a gate terminal electrically connected to a discharging control terminal of the battery controller, a first end electrically connected to the battery, and a second end electrically connected to a first end of the charging control transistor and the load.

The short circuit preventing circuit may include a first transistor including a first end electrically connected to the input terminal and a second end electrically connected to the output terminal; a second transistor including a first end electrically connected to the input terminal and a second end electrically connected to a gate terminal of the first transistor; and a third transistor including a first end electrically connected to a gate terminal of the second transistor, a second end electrically connected to a reference voltage, and a gate terminal electrically connected to the voltage sensing terminal. The first transistor may be a PMOS transistor, the second transistor may be a PMOS transistor, and the third transistor may be an NMOS transistor. The short circuit preventing circuit may include a zener diode including a cathode electrically connected to the input terminal and an anode electrically connected to the reference voltage.

The battery protective circuit may include a switch to electrically connect the battery protective circuit and the load, wherein the battery may be electrically connected to the load when the switch is turned on and the battery may be electrically disconnected from the load when the switch is turned off. A positive terminal of the battery, a first end of the switch, and a positive terminal of the charger may be electrically connected to each other, a second end of the switch, a positive terminal of the load, and the voltage sensing terminal are electrically connected to each other, a negative terminal of the battery and a first end of the discharging control transistor may be electrically connected to each other, a second end of the discharging control transistor, a first end of the charging control transistor, and a negative terminal of the load may be electrically connected to each other, and a second end of the charging control transistor and a negative terminal of the charger may be electrically connected to each other.

The charging control transistor may be turned off when the charging control voltage is at a low-level. The charging control transistor may be turned off, regardless of whether the charging control voltage is at a high-level or a low-level, when the switch is turned on.

In accordance with one or more other embodiments, an apparatus includes a circuit; a first terminal; a second terminal; and a third terminal to be connected to a load, wherein the circuit is to output a signal through the second terminal to turn off a charging control transistor for a battery, regardless of a charging control voltage of the first terminal, when a voltage equal to or greater than a threshold voltage is sensed at the third terminal. The circuit may include a first transistor electrically connected to the first and second terminals; a second transistor electrically connected to the first terminal and a gate terminal of the first transistor; and a third transistor electrically connected to the second transistor and the third terminal. A gate of the first transistor may be connected to the second transistor, a gate of the second transistor may be connected to the third transistor, and a gate of the third transistor may be connected to the third terminal.

The first and second transistors may be a first conductivity type, and the third transistor may be of a second conductivity type different from the first conductivity type. The apparatus may include a zener diode electrically connected to the first terminal and a reference voltage, wherein the third transistor is connected to the reference voltage.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
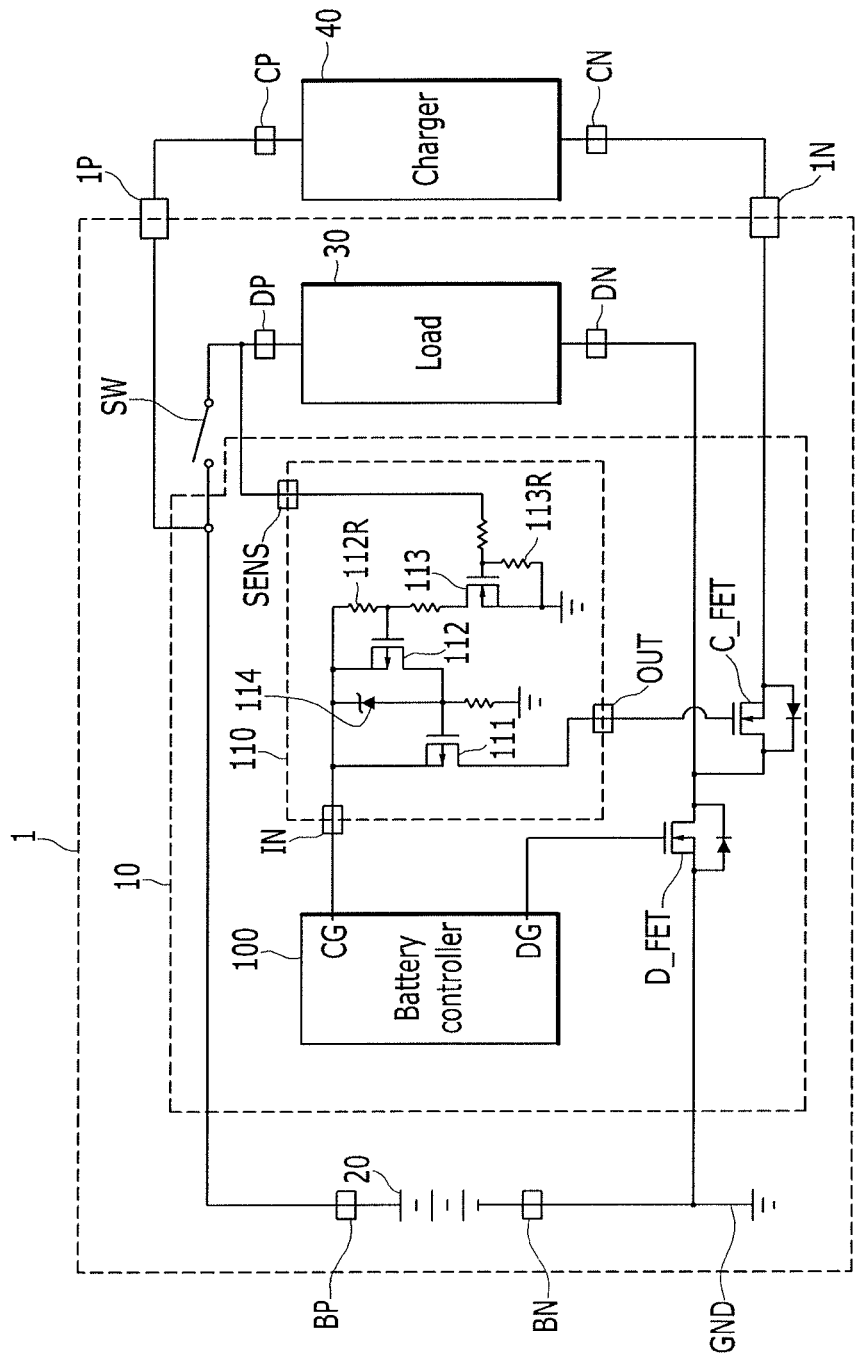
FIG. 1 illustrates an embodiment of a battery protective circuit.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. For example, electrically connecting two constituent elements includes directly connecting two constituent elements and connecting the same with another constituent element therebetween. The other constituent element may include a switch, a resistor, and a capacitor. When the exemplary embodiments are described, an expression of connection signifies electrical connection when an expressed of direct connection is not provided.

In addition, when an element is referred to as "including" a component, this indicates that the element may further include another component instead of excluding another component unless there is different disclosure.

FIG. 1 illustrates an embodiment of a battery protective circuit 10 in an electronic device 1. More specifically, the electronic device 1 includes a battery 20, the battery protective circuit 10, a switch SW, and a load 30. Charging terminals 1P and 1N of the electronic device 1 may be connected to a positive terminal CP and a negative terminal CN of a charger 40. The electronic device 1 may be, for example, a cleaner and the load 30 may be a motor of the cleaner. The battery 20 may be a rechargeable battery that is subject to being repeatedly charged and discharged.

The switch SW may be a mechanical or electrical switch operable by a user. When the switch SW is turned on, a positive terminal BP of the battery 20 is electrically connected to a positive terminal DP of the load 30 through the battery protective circuit 10. When the switch SW is turned off, the positive terminal BP of the battery 20 is electrically disconnected from the positive terminal DP of the load 30.

The battery protective circuit 10 includes a battery controller 100, a charging control transistor C_FET, a discharging control transistor D_FET, and a short circuit preventing circuit portion 110. The battery controller 100 may be, for example, an integrated circuit IC. In one embodiment, the battery protective circuit 10 may be a low-cost such as a non-smart battery IC. In this case, the battery controller 100 may not include a microcontroller (MCU) and may perform a basic protection function. In another embodiment, the battery protective circuit 10 may include an MCU.

In the present exemplary embodiment, the battery controller 100 includes a charging control terminal CG and a discharging control terminal DG. The battery controller 100 controls the charging control transistor C_FET according to a charging control voltage output from the charging control terminal CG, and controls the discharging control transistor D_FET according to a discharging control voltage output from the discharging control terminal DG.

The discharging control transistor D_FET connects the negative terminal BN of the battery 20 and the negative terminal DN of the load 30 to each other or disconnects them from each other. The discharging control transistor D_FET includes a gate terminal electrically connected to the discharging control terminal DG, a first end electrically connected to the negative terminal BN of the battery 20, and a second end electrically connected to the first end of the charging control transistor C_FET and the negative terminal DN of the load 30. For example, the discharging control transistor D_FET may be an NMOS transistor that is turned on when a discharging control voltage equal to or greater than a threshold voltage is applied to the gate terminal, and is turned off when a discharging control voltage less than the threshold voltage is applied to the gate terminal.

The charging control transistor C_FET connects the negative terminal BN of the battery 20 and the negative terminal CN of the charger 40 to each other or disconnects them from each other. The charging control transistor C_FET includes a gate terminal electrically connected to an output terminal OUT of the short circuit preventing circuit portion 110. The charging control transistor C_FET includes a first end electrically connected to a second end of the discharging control transistor (D_FET), and a second end electrically connected to the negative terminal CN of the charger 40. For example, the charging control transistor C_FET may be an NMOS transistor that is turned on when a voltage equal to or greater than a threshold voltage is applied to the gate terminal, and is turned off when a voltage less than the threshold voltage is applied to the gate terminal.

The short circuit preventing circuit portion 110 may include a voltage sensing terminal (SENS) electrically connected to the positive terminal DP of the load 30, an input terminal IN electrically connected to the charging control terminal CG, and an output terminal OUT electrically connected to the gate terminal of the charging control transistor C_FET.

The short circuit preventing circuit portion 110 may include a first transistor 111, a second transistor 112, and a third transistor 113. The first transistor 111 includes a first end electrically connected to the input terminal IN and a second end electrically connected to the output terminal OUT. The second transistor 112 includes a first end electrically connected to the input terminal IN and a second end electrically connected to the gate terminal of the first transistor 111. The third transistor includes a first end electrically connected to a gate terminal of the second transistor 112, a second end electrically connected to a reference voltage (e.g., GND), and a gate terminal electrically connected to the voltage sensing terminal SENS. The first transistor 111 may be a PMOS transistor, the second transistor 112 may be a PMOS transistor, and the third transistor 113 may be a NMOS transistor.

The short circuit preventing circuit portion 110 may further include a zener diode 114. The zener diode 114 includes a cathode electrically connected to the input terminal IN and an anode electrically connected to the reference voltage GND. The zener diode 114 may be included as an option for when an overvoltage is applied to the input terminal IN of the short circuit preventing circuit portion 110.

Operation of the battery protective circuit 10 will now be described. When respective voltages are described to be applied to a transistor, influence to a voltage level by a resistor may be ignored.

When there is no problem in the protection of the battery, the battery controller 100 may output a discharging control voltage and a charging control voltage, having a voltage value greater than a threshold voltage with respect to the reference voltage GND, through the discharging control terminal DG and the charging control terminal CG. The discharging control voltage and the charging control voltage may have high-level voltage values respectively.

When the switch SW is turned off, there is no voltage input through the voltage sensing terminal SENS. In this case, the gate-source voltage difference between the gate terminal and the second end of the third transistor 113 becomes less than the threshold voltage by a pull-down resistor 113R and thus the third transistor 113 is turned off. The source-gate voltage difference between the first end and the gate terminal of the second transistor 112 is less than the threshold voltage by a pull-down resistor 112R and thus the second transistor 112 is turned off.

When the high-level charging control voltage is applied to the first end of the first transistor 111 and the reference voltage GND is applied to the gate terminal of the first transistor 111, the source-gate voltage difference of the first transistor 111 becomes greater than the threshold voltage and the first transistor 111 and thus is turned on. The high-level charging control voltage is applied to the gate terminal of the charging control transistor C_FET through the output terminal OUT. As a result, the charging control transistor C_FET is turned on. The high-level discharging control voltage is applied to the gate terminal of the discharging control transistor D_FET and thus the discharging control transistor D_FET is turned on.

Although the charging control transistor C_FET is turned on, the switch SW is turned off. Thus, a short circuit between the charger 40 and the load 30 is prevented.

When the switch SW is turned on by a user, a current path is formed in order of the positive terminal BP of the battery 20, the switch SW, the load 30, the discharging control transistor D_FET, and the negative terminal BN of the battery 20, and the load 30 is then driven.

In this case, a high voltage corresponding to the positive terminal BP of the battery 20 is applied to the gate terminal of the third transistor 113 through the voltage sensing terminal SENS and the reference voltage GND is applied to the second end of the third transistor 113. As a result, the third transistor 113 with the gate-source voltage difference equal to or greater than the threshold voltage is turned on. The reference voltage GND is applied to the gate terminal of the second transistor 112 through the turned-on third transistor 113 and the high-level charging control voltage is applied to the first end of the second transistor 112. Thus, the source-gate voltage difference of the second transistor 112 becomes equal to or greater than the threshold voltage. As a result, the second transistor 112 is turned on. The high-level charging control voltage is applied to the gate terminal of the first transistor 111 through the turned-on second transistor 112, and the high-level charging control voltage is applied to the first end of the first transistor 111. Thus, the source-gate voltage difference of the first transistor 111 becomes less than the threshold voltage and the first transistor 111 is turned off. When this occurs, the output terminal OUT is placed in a floating state and the charging control transistor C_FET is turned off. In one embodiment, the battery protective circuit 10 may include a pull-down resistor between the gate terminal and the second end of the charging control transistor C_FET.

Therefore, when the switch SW is turned on, the charging control transistor C_FET is turned off regardless of the connection of the electronic device 1 and the charger 40 and thus a short circuit between the charger 40 and the load 30 is prevented. Therefore, according to the present exemplary embodiment, a low-cost battery protective circuit 10 for preventing a short circuit of the charger 40 and the load 30 may be provided without the additional element of an MCU.

In another operational example, when the battery controller 100 outputs a low-level charging control voltage for the purpose of performing a protective operation, the charging control transistor C_FET is turned off. The low level signifies a voltage level for the case in which a voltage difference from the reference voltage GND fails to reach the threshold voltage for turning on the transistor. When the low-level charging control voltage is applied to the first end of the first transistor 111, the source-gate voltage difference of the first transistor 111 becomes less than the threshold voltage. As a result, the first transistor 111 is turned off and thus the charging control transistor C_FET is turned off.

In another exemplary embodiment, the charging control transistor C_FET and the discharging control transistor D_FET may be PMOS transistors, not NMOS transistors, and may be on the side of the positive terminal BP of the battery 20. The transistors 111, 112, and 113 may be NMOS or PMOS transistors depending, for example, on an intended circuit design. For example, when the voltage sensing terminal SENS is electrically connected to the negative terminal DN of the load 30 and the switch SW is on the side of the negative terminal DN of the load 30, the transistor 113 may be a PMOS transistor.

Figure 2:
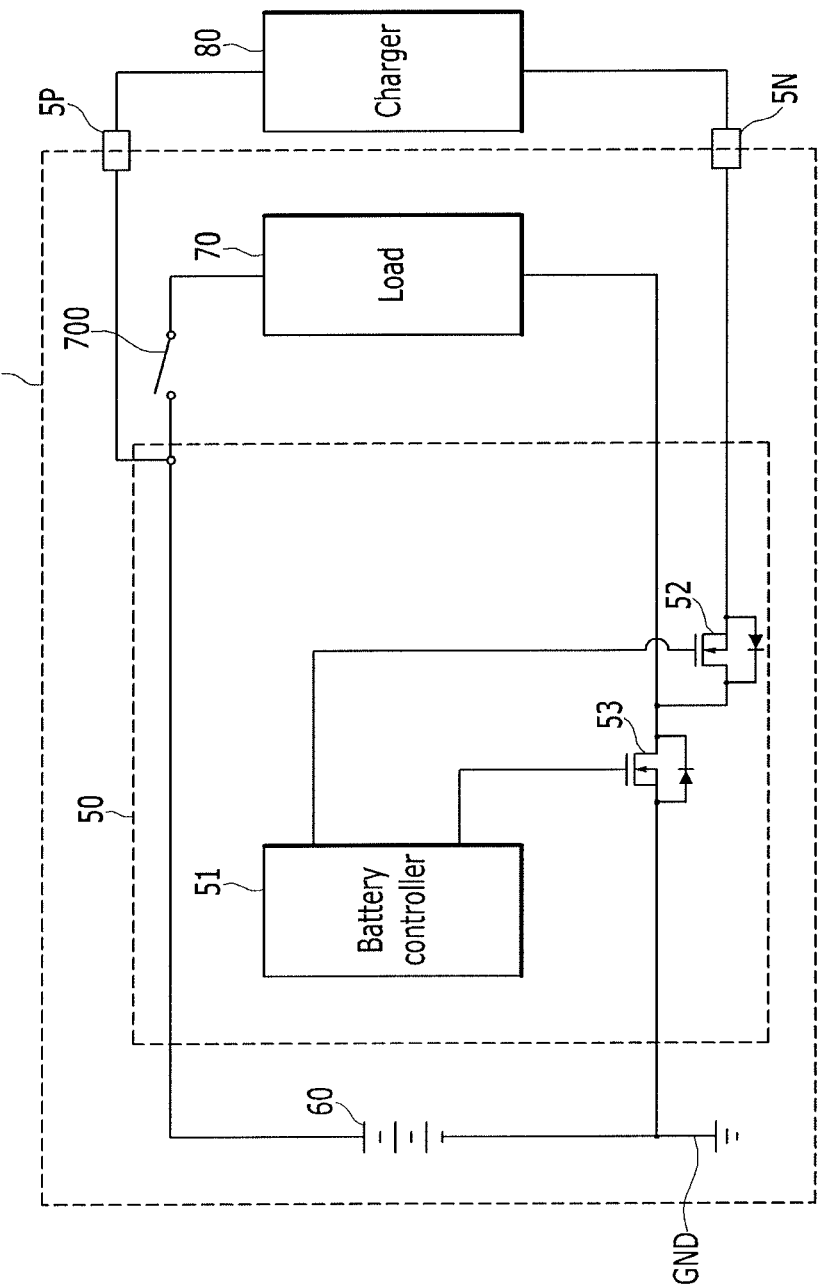
FIG. 2 illustrates a related-art battery protective circuit.

FIG. 2 illustrates a related-art battery protective circuit 50 for an electronic device 5, which includes a battery 60, a switch 700, and a load 70. When the switch 700 is turned on, the battery 60 and the load 70 are connected through the battery protective circuit 50 and power may be supplied to the load 70.

When the battery 60 is to be charged, charging terminals 5P and 5N of the electronic device 5 are connected to a charger 80. When the electronic device 5 is connected to the charger 80 and the switch 700 in an OFF state, a battery controller 51 may turn on a discharging control transistor 53 and a charging control transistor 52 to charge the battery 60 with the charger 80.

However, when the switch 700 is in an ON state while the electronic device 5 and the charger 80 are connected and the charging control transistor 52 is not turned off, the load 70 and the charger 80 are short-circuited from each other according to a path passing through the charger 80, the charging terminal 5P, the switch 700, the load 70, the charging control transistor 52, the charging terminal 5N, and the charger 80. When the load 70 and the charger 80 are short-circuited from each other, the load 70 may be driven with power of the charger 80, regardless of the on and off states of the discharging control transistor 53. As a result, the charger 80 may not appropriately charge battery 60.

In an attempt to prevent this from happening, an MCU has been used to turn off the charging control transistor 52. Use of an MCU increases costs and requires additional signal processing. In accordance with one or more embodiments, a battery protective circuit for preventing a short circuit of a charger and load is provided at low cost and without using an MCU. In some of the aforementioned embodiments, the switch SW was indicated to be one adjusted by a user. In another embodiment, the switch may be controlled, for example, by a control circuit or software based on one or more predetermined conditions.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The controller and other processing features of the embodiments may be implemented in logic which, for example, may include hardware, software, or both. When implemented at least partially in hardware, the controller and other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controller and other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the embodiments set forth in the claims.

What is claimed is:

1. A battery protective circuit, comprising:
   a battery controller including a charging control terminal, the battery controller to control charging of a battery according to a charging control voltage output through the charging control terminal;
   a charging control transistor to electrically connect the battery to a charger or to electrically disconnect the battery from the charger;
   a switch between the battery and a load, wherein the battery is electrically connected to the load when the switch is turned on and the battery is electrically disconnected from the load when the switch is turned off; and
   a short circuit preventing circuit including a voltage sensing terminal electrically connected to the load, an input terminal electrically connected to the charging control terminal, and an output terminal electrically connected to a gate terminal of the charging control transistor, the short circuit preventing circuit to output a signal through the output terminal to turn off the charging control transistor when the switch is turned on.

2. The circuit as claimed in claim 1, further comprising:
   a discharging control transistor to electrically connect the battery to the load or to electrically disconnect the battery from the load, wherein the discharging control transistor includes a gate terminal electrically connected to a discharging control terminal of the battery controller, a first end electrically connected to the battery, and a second end electrically connected to a first end of the charging control transistor and the load.

3. The circuit as claimed in claim 2, wherein the short circuit preventing circuit includes:
   a first transistor including a first end electrically connected to the input terminal and a second end electrically connected to the output terminal;
   a second transistor including a first end electrically connected to the input terminal and a second end electrically connected to a gate terminal of the first transistor; and
   a third transistor including a first end electrically connected to a gate terminal of the second transistor, a second end electrically connected to a reference voltage, and a gate terminal electrically connected to the voltage sensing terminal.

4. The circuit as claimed in claim 2, wherein:
   a positive terminal of the battery, a first end of the switch, and a positive terminal of the charger are electrically connected to each other,
   a second end of the switch, a positive terminal of the load, and the voltage sensing terminal are electrically connected to each other,
   a negative terminal of the battery and a first end of the discharging control transistor are electrically connected to each other,
   a second end of the discharging control transistor, a first end of the charging control transistor, and a negative terminal of the load are electrically connected to each other, and
   a second end of the charging control transistor and a negative terminal of the charger are electrically connected to each other.

5. The circuit as claimed in claim 4, wherein the charging control transistor is to be turned off when the charging control voltage is at a low-level.

6. The circuit as claimed in claim 3, wherein:
   the first and second transistors are of a first conductivity type, and
   the third transistor is of a second conductivity type different from the first conductivity type.

7. The circuit as claimed in claim 6, wherein:
   the first transistor is a PMOS transistor,
   the second transistor is a PMOS transistor, and
   the third transistor is an NMOS transistor.

8. The circuit as claimed in claim 6, wherein the short circuit preventing circuit includes a zener diode including a cathode electrically connected to the input terminal and an anode electrically connected to the reference voltage.

9. The circuit as claimed in claim 3, wherein the short circuit preventing circuit includes a zener diode including a cathode electrically connected to the input terminal and an anode electrically connected to the reference voltage.

10. An apparatus, comprising:
    a circuit;
    a first terminal;
    a second terminal; and
    a third terminal to be connected to a load, wherein the circuit is to output a signal through the second terminal to turn off a charging control transistor for a battery when the third terminal is connected to the load, and wherein the circuit includes:
- a first transistor electrically connected to the first and second terminals;
- a second transistor electrically connected to the first terminal and a gate terminal of the first transistor; and
- a third transistor electrically connected to the second transistor and the third terminal.

11. The apparatus as claimed in claim 10, wherein:
a gate of the first transistor is connected to the second transistor,
a gate of the second transistor is connected to the third transistor, and
a gate of the third transistor is connected to the third terminal.

12. The apparatus as claimed in claim 11, wherein:
the first and second transistors are of a first conductivity type, and
the third transistor is of a second conductivity type different from the first conductivity type.

13. The apparatus as claimed in claim 11, further comprising:
a zener diode electrically connected to the first terminal and a reference voltage, wherein the third transistor is connected to the reference voltage.

14. An apparatus, comprising:
a circuit;
a first terminal;
a second terminal; and
a third terminal to be connected to a load,
wherein the circuit is to output a signal through the second terminal to turn off a charging control transistor for a battery, the circuit including
- a first transistor electrically connected to the first and second terminals;
- a second transistor electrically connected to the first terminal and a gate terminal of the first transistor; and
- a third transistor electrically connected to the second transistor and the third terminal, wherein:
  a gate of the first transistor is connected to the second transistor,
  a gate of the second transistor is connected to the third transistor,
  a gate of the third transistor is connected to the third terminal,
  the first and second transistors are of a first conductivity type, and
  the third transistor is of a second conductivity type different from the first conductivity type.

* * * * *